US011397320B2

(12) United States Patent
Yamaura et al.

(10) Patent No.: US 11,397,320 B2
(45) Date of Patent: Jul. 26, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventors: Yusuke Yamaura, Kanagawa (JP); Seiya Inagi, Kanagawa (JP); Kazunari Hashimoto, Kanagawa (JP); Hidetaka Izumo, Kanagawa (JP); Tadaaki Sato, Kanagawa (JP); Teppei Aoki, Kanagawa (JP); Daisuke Yasuoka, Kanagawa (JP); Hiroshi Umemoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 186 days.

(21) Appl. No.: 16/130,195

(22) Filed: Sep. 13, 2018

(65) Prior Publication Data

US 2019/0094534 A1 Mar. 28, 2019

(30) Foreign Application Priority Data

Sep. 28, 2017 (JP) .............................. JP2017-187305

(51) Int. Cl.
 *G02B 27/01* (2006.01)
 *G06F 3/01* (2006.01)
 (Continued)

(52) U.S. Cl.
 CPC .......... *G02B 27/0101* (2013.01); *G06F 3/011* (2013.01); *G06F 3/017* (2013.01);
 (Continued)

(58) Field of Classification Search
 None
 See application file for complete search history.

(56) References Cited

U.S. PATENT DOCUMENTS 8,494,275 B2 7/2013 Kitada
2002/0069103 A1* 6/2002 Puri ................. G06Q 10/06375
 705/7.37
(Continued)

FOREIGN PATENT DOCUMENTS

JP 5061696 B2 10/2012
JP 2013-045371 A 3/2013
(Continued)

OTHER PUBLICATIONS

Jul. 20, 2021 Office Action issued in Japanese Patent Application No. 2017-187305.
(Continued)

*Primary Examiner* — Frank S Chen
(74) *Attorney, Agent, or Firm* — Oliff PLC

(57) ABSTRACT

An information processing apparatus includes a detector and a command unit. The detector detects movement of a user using a display device based on an image photographed by the display device that displays a virtual-space image in such a manner as to be overlapped with a real space and that has a photographing function. The command unit commands the display device to display, as the virtual-space image, relevant information related to input information input to an input target at a position near the input target based on the detected movement of the user.

11 Claims, 8 Drawing Sheets

(51) Int. Cl.
*G06F 16/951* (2019.01)
*G06F 3/0481* (2022.01)
*G06F 3/023* (2006.01)
*G06F 40/166* (2020.01)
*G06F 40/169* (2020.01)
*G06F 40/171* (2020.01)
*G06V 20/20* (2022.01)
*G06V 40/10* (2022.01)

(52) U.S. Cl.
CPC .......... *G06F 3/0237* (2013.01); *G06F 3/0481* (2013.01); *G06F 16/951* (2019.01); *G06F 40/166* (2020.01); *G06F 40/169* (2020.01); *G06F 40/171* (2020.01); *G06V 20/20* (2022.01); *G06V 40/107* (2022.01); *G02B 2027/014* (2013.01); *G02B 2027/0138* (2013.01)

(56) References Cited

U.S. PATENT DOCUMENTS

| | | | | |
|---|---|---|---|---|
| 2007/0154116 | A1* | 7/2007 | Shieh | G06F 3/03545 382/314 |
| 2009/0015567 | A1* | 1/2009 | Abdelbaki | G10L 13/00 345/179 |
| 2009/0119590 | A1* | 5/2009 | Kondziela | G06F 3/1454 715/716 |
| 2013/0283157 | A1* | 10/2013 | Ebata | G06T 11/60 715/265 |
| 2014/0160157 | A1 | 6/2014 | Poulos et al. | |
| 2015/0145887 | A1* | 5/2015 | Forutanpour | G02B 27/017 345/633 |
| 2015/0169975 | A1* | 6/2015 | Kienzle | G06T 1/0007 382/189 |
| 2015/0199780 | A1* | 7/2015 | Beyk | G06Q 50/184 705/310 |
| 2016/0025974 | A1 | 1/2016 | Osterhout et al. | |
| 2016/0147307 | A1* | 5/2016 | Masuko | G06F 40/186 715/863 |
| 2016/0253992 | A1* | 9/2016 | Raux | G10L 15/32 704/240 |

FOREIGN PATENT DOCUMENTS

| | | |
|---|---|---|
| JP | 5488082 B2 | 5/2014 |
| JP | 2015-180988 A | 10/2015 |
| JP | 2015-228256 A | 12/2015 |
| JP | 2016-506565 A | 3/2016 |
| WO | 2014/054716 A1 | 4/2014 |
| WO | 2014/073346 A1 | 5/2014 |

OTHER PUBLICATIONS

Mar. 1, 2022 Office Action issued in Japanese Patent Application No. 2017-187305.

* cited by examiner

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-187305 filed Sep. 28, 2017.

BACKGROUND

Technical Field

The present invention relates to information processing apparatuses, information processing systems, and non-transitory computer readable media.

SUMMARY

According to an aspect of the invention, there is provided an information processing apparatus including a detector and a command unit. The detector detects movement of a user using a display device based on an image photographed by the display device that displays a virtual-space image in such a manner as to be overlapped with a real space and that has a photographing function. The command unit commands the display device to display, as the virtual-space image, relevant information related to input information input to an input target at a position near the input target based on the detected movement of the user.

BRIEF DESCRIPTION OF THE DRAWINGS

Exemplary embodiments of the present invention will be described in detail based on the following figures, wherein.

DETAILED DESCRIPTION

Figure 1A:
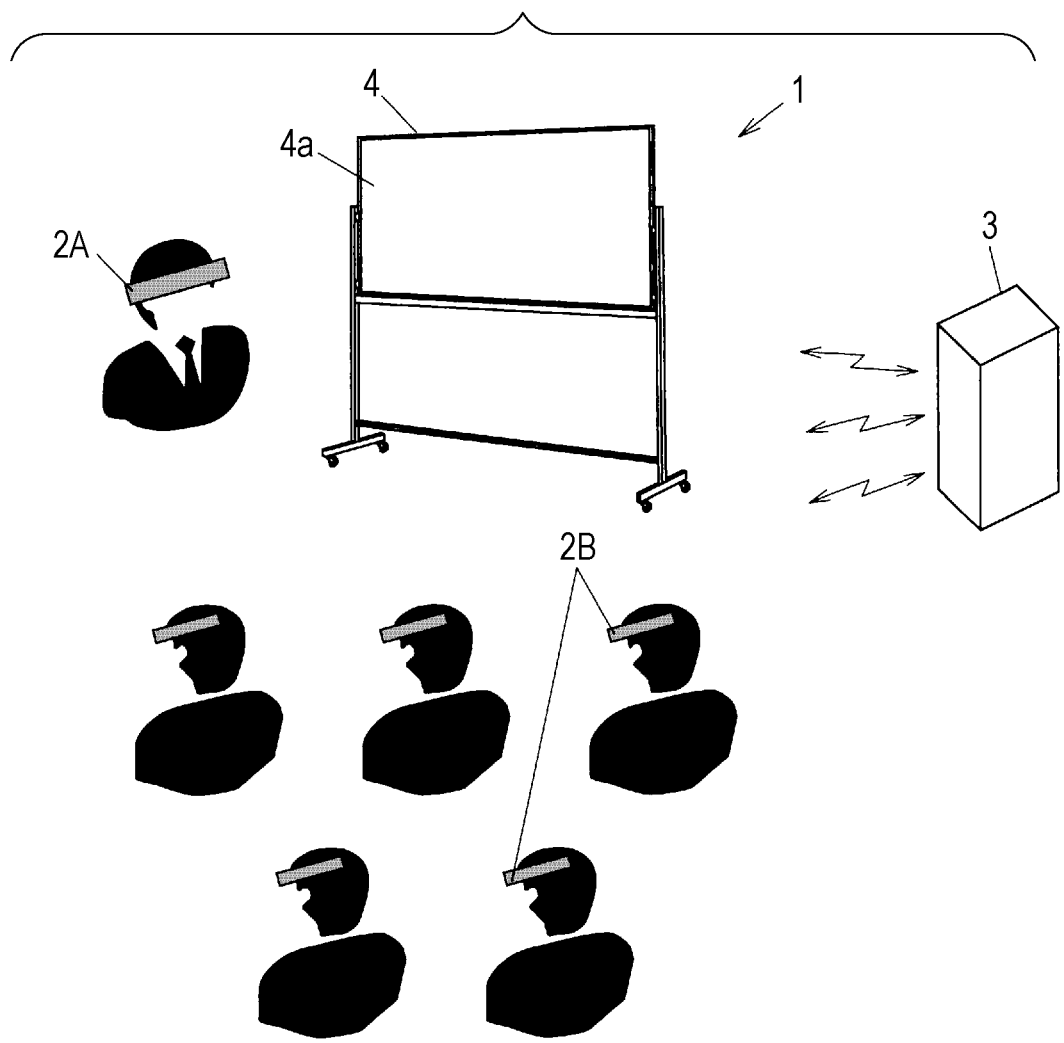
FIG. 1A illustrates a configuration example of an information processing system according to an exemplary embodiment of the present invention.

Exemplary embodiments of the present invention will be described below with reference to the drawings. In the drawings, components having substantially identical functions are given the same reference signs, and redundant descriptions thereof will be omitted.

An information processing apparatus according to an exemplary embodiment of the present invention includes a detector and a command unit. The detector detects movement of a user using a display device based on an image photographed by the display device that displays a virtual-space image in such a manner as to be overlapped with a real space and that has a photographing function. The command unit commands the display device to display, as the virtual-space image, relevant information related to input information input to an input target at a position near the input target based on the detected movement of the user.

The term "display device" includes a light-transmissive head-mounted display device that is to be worn on a head of a user and through which the user is capable of directly viewing a real space (background) simultaneously with a display image as a virtual-space image, as well as a portable information terminal that displays a display image as a virtual-space image on a photographed image of the background in an overlapping manner. The light-transmissive head-mounted display device may be in the form of goggles or eyeglasses. The portable information terminal may be of a head-mounted type.

The "input target" refers to a target to which input information is input by using a writing unit and corresponds to, for example, a whiteboard or a plastic sheet, in place of a whiteboard, attached to a table or a wall. The input target may have coordinates, such as an Anoto pattern (fine dot pattern), embedded therein. The writing unit is selected in accordance with the input target and corresponds to, for example, a whiteboard pen (i.e., whiteboard marker) or an Anoto-pattern-readable digital pen.

The relevant information is information related to the input information. The relevant information includes, for example, a display image related to ruled lines for guiding the text input position and the text size, a display image related to a file or a web image, and support information for supporting an input process performed by the user for inputting the input information to the input target.

Exemplary Embodiment

Figure 1B:
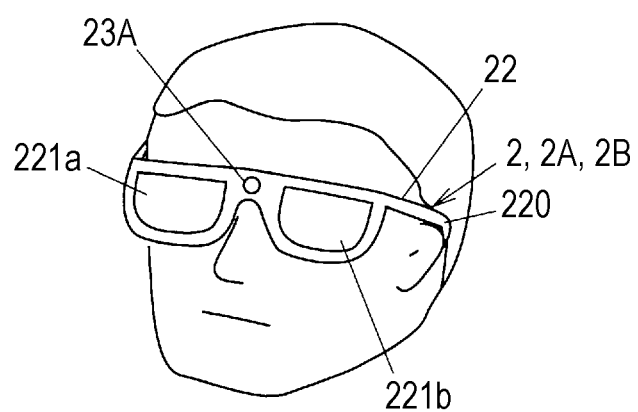
FIG. 1B is an external view illustrating an example of a head-mounted display device.

FIG. 1A illustrates a configuration example of an information processing system according to an exemplary embodiment of the present invention. FIG. 1B is an external view illustrating an example of a head-mounted display device.

An information processing system 1 includes a head-mounted display device (referred to as "HMD device" hereinafter) 2A used by a first user, HMD devices 2B used by second users, an information processing apparatus 3 that controls the HMD devices 2A and 2B (collectively referred to as "HMD devices 2" hereinafter), and a whiteboard 4 to be used by the first user for inputting text or a graphic thereto. The HMD devices 2 and the information processing apparatus 3 are wirelessly connected to each other in a communicable manner. The first user and the second users are examples of users. The whiteboard 4 is an example of an input target. The text and graphic are an example of input information.

In the case of this exemplary embodiment, the information processing system 1 may be used in, for example, an office, a public facility, a meeting room in a hospital, a multipurpose room, a lounge, or a lecture room. In this exemplary embodiment, the first user is, for example, a presenter giving a presentation in a meeting or a lecture (normally, one person per meeting or lecture), and the second users are, for example, participants participating in the meeting or lecture (normally, multiple people). The presenter and the participants may sometimes be collectively referred to as "users" hereinafter.

The HMD devices 2 are configured to virtually display a so-called virtual image by displaying a virtual-space image (referred to as "virtual image" hereinafter) in such a manner as to be overlapped with the real space. Specifically, as shown in FIG. 1B, each HMD device 2 is a light-transmissive head-mounted display device that is to be worn on the head of a user and through which the user is capable of directly viewing the real space (background) simultaneously with the virtual image.

Each HMD device 2 includes a display unit 22 and an outward camera 23A. The display unit 22 includes a frame 220 to be mounted to the ears, and also includes a right transmissive display 221a and a left transmissive display 221b (sometimes collectively referred to as "transmissive displays 221").

The transmissive displays 221 may be, for example, transmissive liquid-crystal displays, transmissive organic electroluminescence (EL) displays, or transmissive inorganic EL displays. The right transmissive display 221a displays a display image for the right eye, and the left transmissive display 221b displays a display image for the left eye. The right-eye display image and the left-eye display image are overlapped with the background and are visually recognized as a virtual image by the user.

Figure 2:
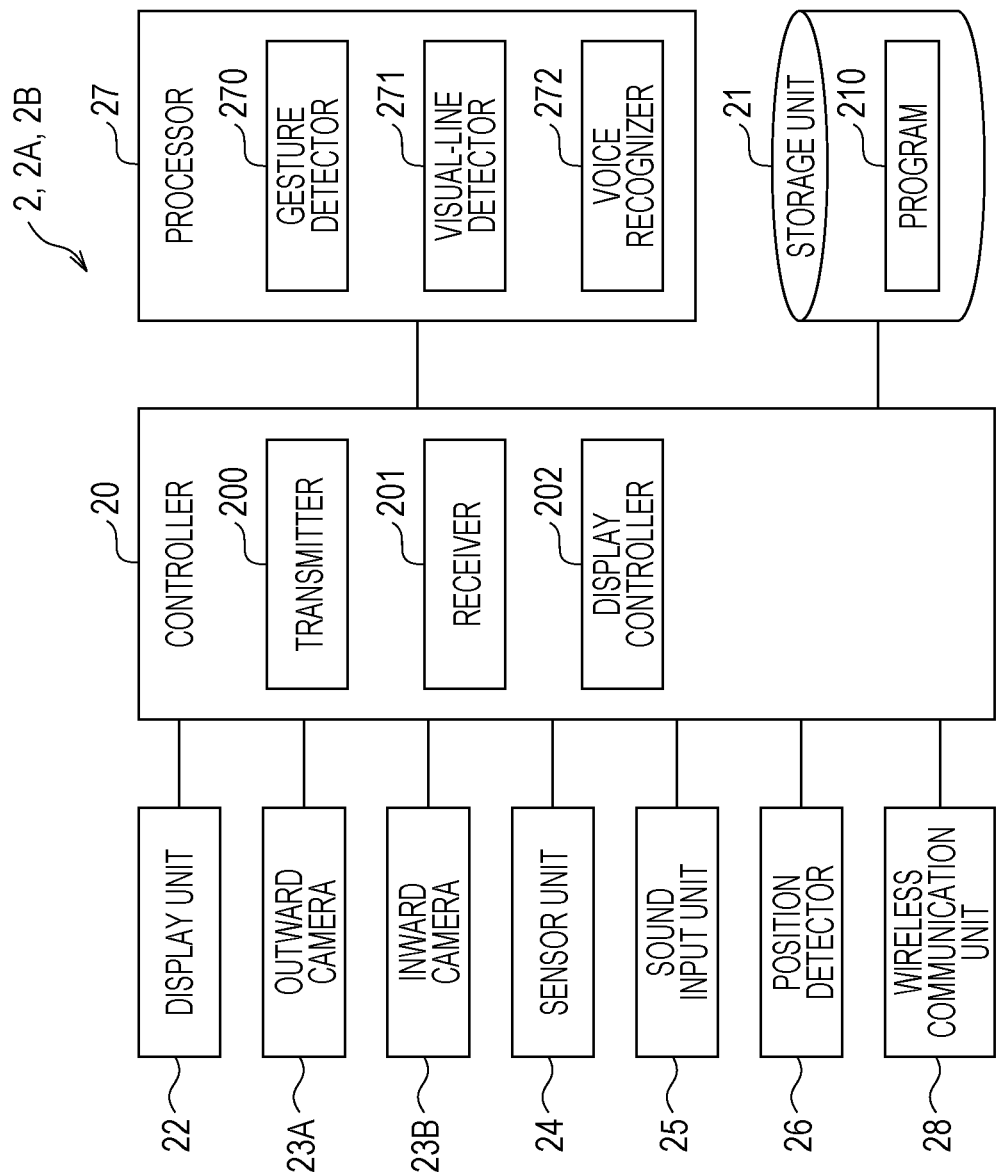
FIG. 2 illustrates an example of a control system of each HMD device.

FIG. 2 illustrates an example of a control system of each HMD device 2. The HMD device 2 includes a controller 20 that controls each component of the HMD device 2, a storage unit 21 that stores various types of information, the aforementioned display unit 22, the aforementioned outward camera 23A, an inward camera 23B, a sensor unit 24, a sound input unit 25, a position detector 26, a processor 27, and a wireless communication unit 28.

The controller 20 is constituted of, for example, a central processing unit (CPU) and an interface. The CPU operates in accordance with a program 210 stored in the storage unit 21 so as to function as, for example, a transmitter 200, a receiver 201, and a display controller 202. The components 200 to 202 will be described in detail later.

The storage unit 21 is constituted of, for example, a read-only memory (ROM), a random access memory (RAM), and a hard disk and stores therein, for example, programs and data.

The outward camera 23A photographs the background that includes the face of an opposing person as well as a hand of the user, and transmits the photographed image to the controller 20. The inward camera 23B photographs the eyes of the user using the HMD device 2 and transmits the photographed image to the controller 20. The images to be photographed by the outward camera 23A and the inward camera 23B may be still images or moving images. In a case where the user is to be determined from a facial image, a still image may be used. In a case where a gesture is to be detected by photographing the hand of the user or a visual line is to be detected, a moving image is desirable or continuous still images obtained by photographing multiple images per second are desirable.

The sensor unit 24 includes a distance image sensor, an acceleration sensor, and a gyroscope. The distance image sensor may be, for example, an infrared distance sensor, a laser distance sensor, or an ultrasonic distance sensor. The distance image sensor radiates infrared light, laser light, or an ultrasonic wave and reads the distance for each pixel from the time difference of the reflection thereof so as to obtain a distance image. The acceleration sensor detects acceleration applied to the HMD device 2. The gyroscope detects an angular speed applied to the HMD device 2.

The sound input unit 25 is constituted of a microphone and converts a voice output by the user using the HMD device 2 into a voice signal, which is an electric signal, and receives the voice signal.

The processor 27 processes information input by the outward camera 23A, the inward camera 23B, the sensor unit 24, and the sound input unit 25 and includes a gesture detector 270, a visual-line detector 271, and a voice recognizer 272.

The gesture detector 270 detects a gesture that indicates movement of the user using the HMD device 2. Specifically, the gesture detector 270 detects a predetermined hand gesture in accordance with movement of the user's hand (e.g., a two-finger pinching operation) from the distance image detected by the distance image sensor of the sensor unit 24. Furthermore, the gesture detector 270 detects a predetermined head gesture in accordance with movement of the user's head (e.g., sideways shaking of the head) based on the acceleration of the HMD device 2 detected by the acceleration sensor of the sensor unit 24 and the angular speed of the HMD device 2 detected by the gyroscope. The gesture detector 270 transmits a command corresponding to the detected gesture to the controller 20.

The visual-line detector 271 detects the visual-line direction of the user from an image of the user's eyes photographed by the inward camera 23B, and transmits a command corresponding to the detected visual-line direction to the controller 20. A method of detecting the visual line may involve, for example, using a visible-light camera as the inward camera 23B to detect the visual-line direction based on the position of the iris relative to the position of the inner corner of an eye or using an infrared camera and an infrared light emitting diode as the inward camera 23B to detect the visual-line direction based on the position of the pupil relative to the position of corneal reflex. The visual-line direction may be used in place of a gesture.

The voice recognizer 272 converts the voice signal received by the sound input unit 25 into digital voice data and transmits the voice data to the controller 20. A voice may be used in place of a gesture.

The wireless communication unit 28 communicates with the information processing apparatus 3 by using near field communication, such as Wi-Fi (Wireless Fidelity), a wireless local area network (LAN), such as Wi-Fi Direct, Bluetooth (registered trademark), or infrared communication. The wireless communication unit 28 may be used for communication between HMD devices 2.

The position detector 26 regularly detects positional information indicating the position of the HMD device 2 by using a global positioning system (GPS), and transmits the detected positional information to the controller 20. Alternatively, the position of the HMD device 2 may be detected by using a beacon signal. Specifically, the position detector 26 detects a beacon signal containing a beacon ID for identifying a beacon transmitter, and transmits the beacon ID and intensity information about the beacon signal to the information processing apparatus 3. The information processing apparatus 3 acquires positional information of the HMD device 2 from positional information of the beacon transmitter corresponding to the beacon ID and from the intensity of the beacon signal. The positional information is expressed using, for example, (x, y) indicating the longitude and the latitude. Alternatively, the positional information may be expressed using, for example, (x, y, z) indicating the longitude, the latitude, and the altitude.

Next, the components 200 to 202 of each HMD device 2 will be described.

The transmitter 200 transmits the image photographed by the outward camera 23A, the processing result obtained by the processor 27 (e.g., the command corresponding to the gesture detected by the gesture detector 270, the visual-line direction detected by the visual-line detector 271 and the command corresponding to the visual-line direction, or the voice data recognized by the voice recognizer 272), or the positional information detected by the position detector 26 to the information processing apparatus 3 via the wireless communication unit 28 together with a user ID for identifying the user using the HMD device 2.

The receiver 201 receives a display image transmitted from a transmitter 303 of the information processing apparatus 3 and positional information indicating a position at which the display image is to be visually recognized as a virtual image.

The display controller 202 controls the display unit 22 based on the display image and the positional information received by the receiver 201. Specifically, the display controller 202 performs control to generate a right-eye display image and a left-eye display image based on the display image and the positional information received by the receiver 201, cause the right transmissive display 221a to display the right-eye display image, and cause the left transmissive display 221b to display the left-eye display image, so that the user using the HMD device 2 visually recognizes the virtual image at the position corresponding to the positional information.

The display image includes an image of relevant information related to the input information input to a surface 4a of the whiteboard 4 by the presenter. The relevant information includes, for example, a display image related to ruled lines for guiding the text input position and the text size, a display screen related to a web search screen or a file list, and a display image related to support information (e.g., a list of templates, a list of word candidates, and a list of correction candidates) for supporting an input process performed by the presenter. These display images will be described in detail later.

Specifically, the display controller 202 controls the display unit 22 such that a virtual image related to ruled lines is visually recognized on the surface 4a of the whiteboard 4 (see FIG. 1) by the presenter. Moreover, the display controller 202 controls the display unit 22 such that a virtual image related to support information is visually recognized near the whiteboard 4 by the presenter. The expression "near the whiteboard 4" refers to a position outside a region occupied by the surface 4a of the whiteboard 4 in a virtual space overlapped with the real space, and includes, for example, a position at the upper, lower, left, or right side of the surface 4a of the whiteboard 4, a position in front of (i.e., at the user side of) the surface 4a of the whiteboard 4 (i.e., at the front side located away from the surface 4a), and an adjacent position.

Figure 3:
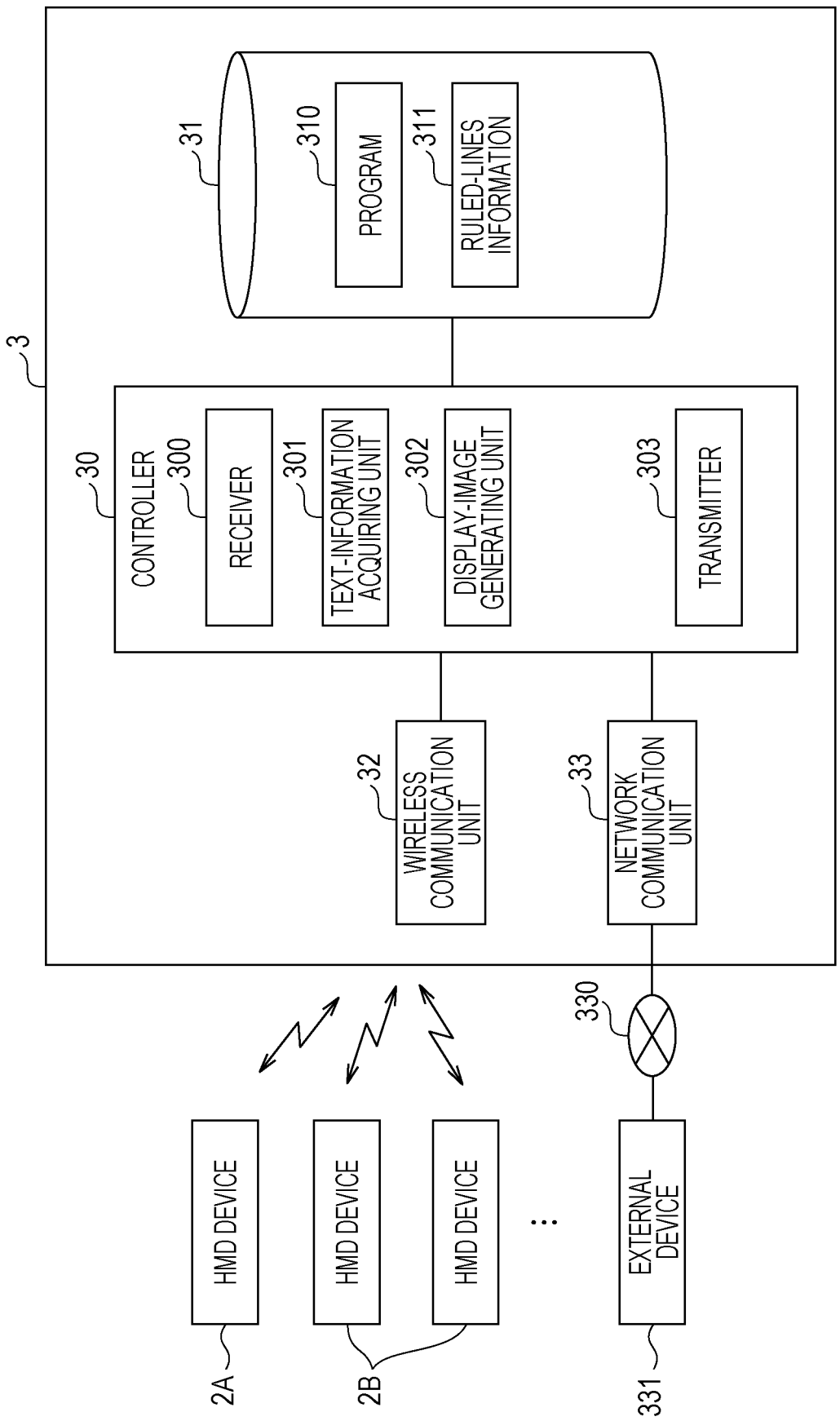
FIG. 3 is a block diagram illustrating an example of a control system of an information processing apparatus.

FIG. 3 is a block diagram illustrating an example of a control system of the information processing apparatus 3. The information processing apparatus 3 includes a controller 30 that controls each component of the information processing apparatus 3, a storage unit 31 that stores various types of information, a wireless communication unit 32 that wirelessly communicates with each HMD device 2, and a network communication unit 33 that communicates with an external device 331 via a network 330.

The wireless communication unit 32 communicates with each HMD device 2 by using near field communication, such as Wi-Fi (Wireless Fidelity), a wireless local area network (LAN), such as Wi-Fi Direct, Bluetooth (registered trademark), or infrared communication.

The network communication unit 33 exchanges signals with the external device 331 via the network 330. The network 330 is, for example, a local area network (LAN), the Internet, or an intranet, and may have a wired or wireless configuration. The external device 331 includes, for example, a web server device.

The controller 30 is constituted of, for example, a central processing unit (CPU) and an interface. The CPU operates in accordance with a program 310 so as to function as, for example, a receiver 300, a text-information acquiring unit 301, a display-image generating unit 302, and the transmitter 303. The display-image generating unit 302 and the transmitter 303 are an example of a command unit. The components 300 to 303 will be described in detail later.

The storage unit 31 is constituted of, for example, a read-only memory (ROM), a random access memory (RAM), and a hard disk and stores therein, for example, the program 310 and ruled-lines information 311. In the ruled-lines information 311, text information input to the whiteboard 4 by the presenter and the spacing of the ruled lines are recorded in association with each other. In this description, the term "record" or "registered" is used when writing information into a table, and the term "store" is used when writing information into a storage unit.

Next, the components 300 to 303 of the information processing apparatus 3 will be described.

The receiver 300 receives, for example, a photographed image, voice data, positional information, and various types of commands transmitted from each HMD device 2.

The text-information acquiring unit 301 executes a text-character recognizing process on the photographed image received by the receiver 300 so as to acquire text information included in the photographed image. A text-character recognizing process involves, for example, executing optical character recognition (OCR) on the photographed image so as to acquire text information included in the photographed image. For example, the text information acquired by the text-information acquiring unit 301 includes not only information related to input information about the text itself and the meaning of the text, but also information indicating the text size, such as the horizontal width and the vertical width of each text character.

Furthermore, the text-information acquiring unit 301 also acquires information about whether or not the spacing of the ruled lines currently displayed as a virtual image is suitable for the size of the input text. Specifically, the text-information acquiring unit 301 determines a difference between the size of the text acquired as text information and the spacing of the ruled lines currently displayed as a virtual image and acquires information about whether this difference is within a predetermined range.

The display-image generating unit 302 generates a display image to be displayed on the display unit 22 of the HMD device 2. For example, the display-image generating unit 302 determines the spacing of the ruled lines by comparing the text information acquired by the text-information acquiring unit 301 with the text information recorded in the ruled-lines information 311 stored in the storage unit 31 of the information processing apparatus 3, and generates a display image related to ruled lines having the determined spacing. Moreover, the display-image generating unit 302 calculates positional information at which the generated display image is to be visually recognized as a virtual image.

The transmitter 303 commands the HMD device 2 to display the generated display image as a virtual-space image. Specifically, the transmitter 303 transmits the display image generated by the display-image generating unit 302 and the positional information at which the display image is to be visually recognized as a virtual-space image to the HMD device 2 (i.e., the HMD device 2A used by the presenter in this exemplary embodiment).

Operation According to Exemplary Embodiment

Figure 4A:
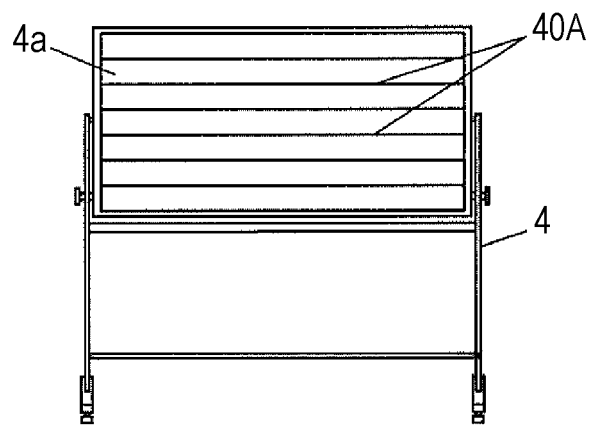
FIGS. 4A to 4C illustrate examples of virtual images, FIG. 4A illustrating an example of a virtual image related to ruled lines, FIG. 4B illustrating an example of a virtual image related to ruled lines having a spacing different from that of the ruled lines shown in FIG. 4A, and FIG. 4C illustrating an example of a virtual image related to box-shaped ruled lines.
Figure 4B:
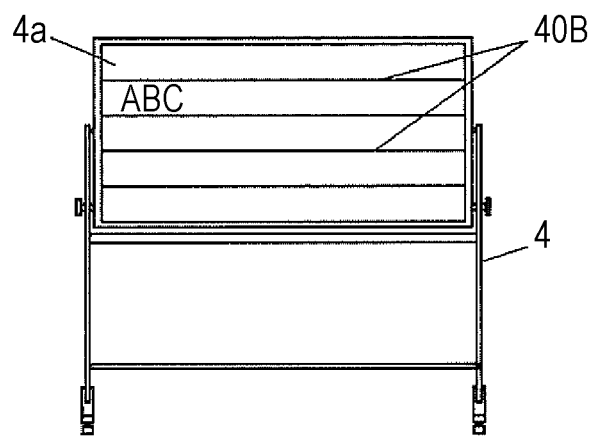
Figure 4C:
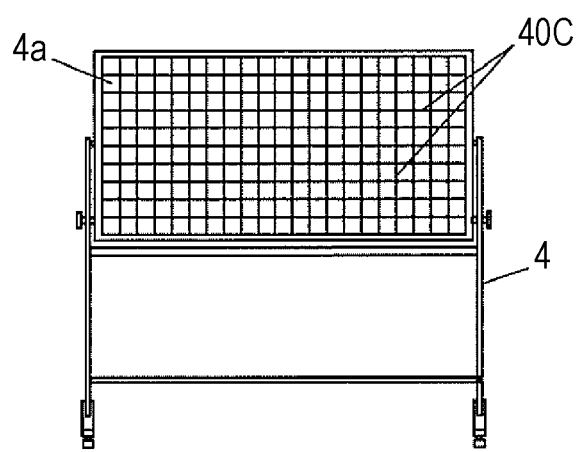
Figure 5:
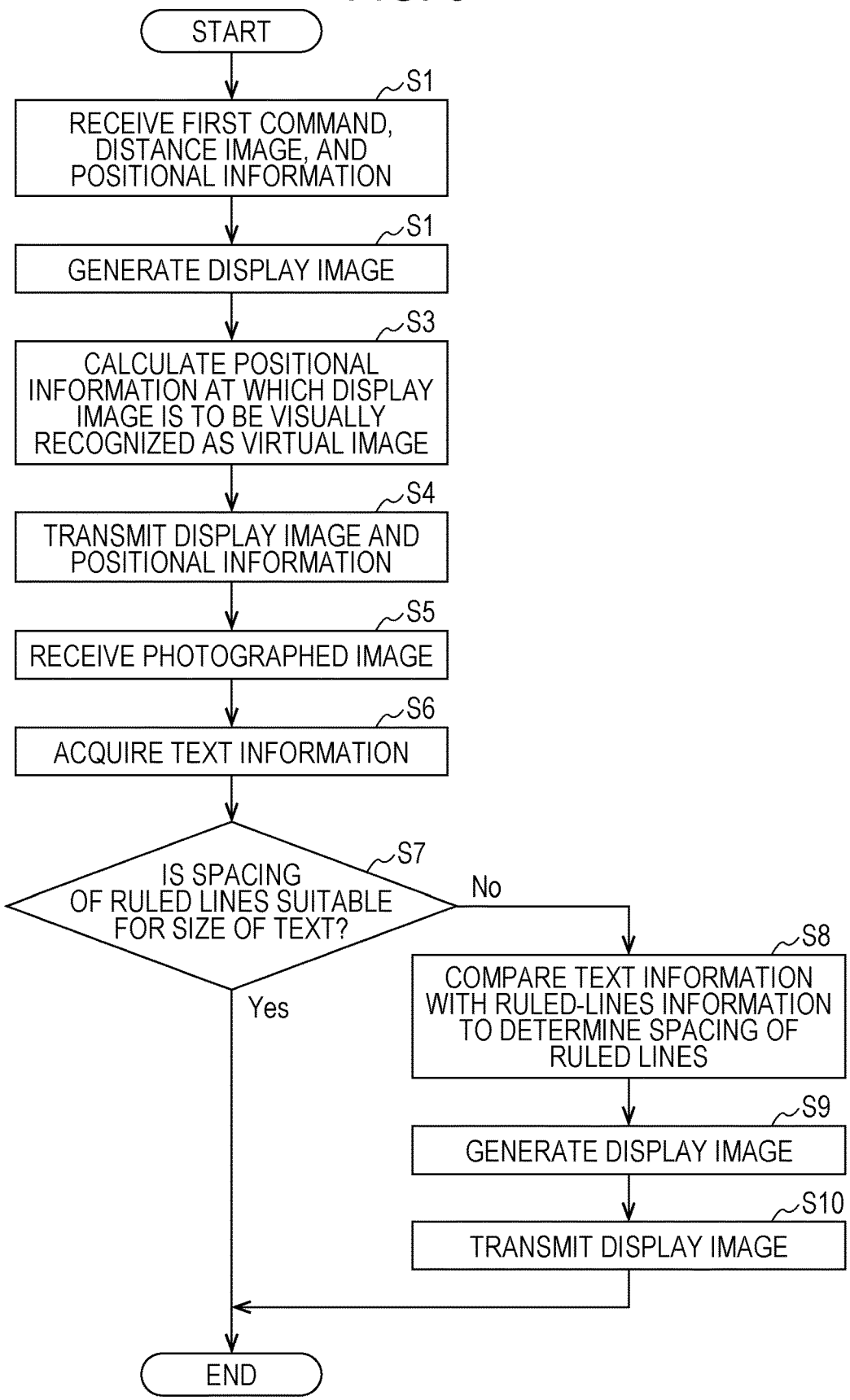
FIG. 5 is a flowchart illustrating an example of the operation of the information processing apparatus according to an exemplary embodiment of the present invention.

Next, an example of operation performed by the information processing system 1 will be described with reference to FIGS. 4A to 4C in accordance with a flowchart in FIG. 5. FIGS. 4A to 4C illustrate an example of virtual images. Specifically, FIG. 4A illustrates an example of a virtual image related to ruled lines, FIG. 4B illustrates a virtual image related to ruled lines having a spacing different from that of the ruled lines shown in FIG. 4A, and FIG. 4C illustrates an example of a virtual image related to box-shaped ruled lines. FIG. 5 is a flowchart illustrating an example of the operation of the information processing apparatus 3 according to an exemplary embodiment of the present invention.

1.Displaying of Ruled Lines

When the presenter moves his/her hand to perform a gesture (first gesture) for making a command for displaying rules lines, the gesture detector 270 of the HMD device 2A detects the first gesture from a distance image acquired by the distance image sensor of the sensor unit 24 and transmits a first command corresponding to the first gesture to the controller 20. The position detector 26 regularly detects positional information indicating the position of the HMD device 2A and transmits the detected positional information to the controller 20. The controller 20 acquires a distance image with respect to the whiteboard 4 from the distance image sensor. The position of the whiteboard 4 relative to the HMD device 2A is determined in accordance with the distance image. The transmitter 200 of the controller 20 transmits the first command, the distance image, and the positional information of the HMD device 2A to the information processing apparatus 3 via the wireless communication unit 28.

In step S1, the receiver 300 receives the first command, the distance image, and the positional information of the HMD device 2A transmitted from the HMD device 2A. When the receiver 300 receives the first command, the display-image generating unit 302 generates a ruled-lines-related display image to be displayed on the display unit 22 of the HMD device 2A in step S2 and calculates positional information at which the ruled-lines-related display image is to be visually recognized as a virtual image in step S3. For example, the ruled-lines-related display image to be generated here is generated based on information recorded in the ruled-lines information 311 and includes multiple lines arranged with a predetermined spacing therebetween.

In step S4, the transmitter 303 of the information processing apparatus 3 transmits, to the HMD device 2A used by the presenter, the ruled-lines-related display image generated by the display-image generating unit 302 and the positional information at which the ruled-lines-related display image is to be visually recognized as a virtual image.

The receiver 201 receives the ruled-lines-related display image transmitted from the transmitter 303 of the information processing apparatus 3 and the positional information at which the ruled-lines-related display image is to be visually recognized as a virtual image.

As shown in FIG. 4A, the display controller 202 controls the display unit 22 based on the display image and the positional information received by the receiver 201 such that a display image related to ruled lines 40A having a predetermined spacing is visually recognized by the presenter as a virtual image on the surface 4a of the whiteboard 4.

2.Acquisition of Text Information

The controller 20 of the HMD device 2A controls the outward camera 23A every time the first command is transmitted from the gesture detector 270 so as to photograph input information about text input to the surface 4a of the whiteboard 4 by the presenter. The controller 20 acquires a photographed image obtained as a result of the outward camera 23A photographing the surface 4a of the whiteboard 4.

The transmitter 200 of the HMD device 2A transmits the photographed image to the information processing apparatus 3.

In step S5, the receiver 300 of the information processing apparatus 3 receives the photographed image transmitted from the HMD device 2A.

In step S6, the text-information acquiring unit 301 executes a text-character recognizing process on the photographed image received by the receiver 300 so as to acquire text information included in the photographed image.

3.Changing of Ruled Lines

If the spacing of the ruled lines currently displayed as a virtual image is not suitable for the size of the input text in step S7, the display-image generating unit 302 determines the spacing of the ruled lines in step S8 by comparing the text information acquired by the text-information acquiring unit 301 and the ruled-lines information 311 stored in the storage unit 31 of the information processing apparatus 3, and generates a display image related to ruled lines having the determined spacing in step S9.

In step S10, the transmitter 303 transmits the display image related to the ruled lines having the determined spacing, generated by the display-image generating unit 302, to the HMD device 2A used by the presenter.

As shown in FIG. 4B, the display controller 202 of the HMD device 2A controls the display unit 22 such that a display image related to ruled lines 40B having the determined spacing is visually recognized by the presenter as a virtual image on the surface 4a of the whiteboard 4.

It is desirable that control be performed such that a virtual image related to the aforementioned ruled lines is displayed only on the HMD device 2A worn by the presenter. Furthermore, although it is described that the participants are also wearing the HMD devices 2B in this exemplary embodiment for the sake of convenience, the participants do not necessarily have to be wearing the HMD devices 2B so long as the presenter is wearing the HMD device 2A.

Accordingly, the information processing apparatus 3 according to the exemplary embodiment of the present invention causes the presenter to virtually view ruled lines according to the size of text input to the surface 4a of the whiteboard 4 so as to support reduced variation in the size of input text and also to support a process of inputting multiple text characters parallel to the upper and lower edges of the whiteboard 4.

Although exemplary embodiments of the present invention have been described above, the present invention is not limited to the exemplary embodiments described above and allows various modifications so long as they do not depart from the scope of the invention. Specific modifications will be described below. In the following description, the components of the controller 20 of the HMD device 2A and the components of the controller 30 of the information processing apparatus 3 each perform operation, unless otherwise noted, and the details of the components described in the above exemplary embodiments will be omitted.

First Modification

Although the display-image generating unit 302 displays a display screen related to ruled lines extending in one direction (e.g., horizontal direction) in the above example, the display unit 22 may be controlled such that a display image related to box-shaped ruled lines 40C is visually recognized by the presenter, as shown in FIG. 4C.

Second Modification

The type of ruled lines may be changed in accordance with a gesture performed by the presenter. A detailed description will be provided below. The expression "the type of ruled lines is changed" refers to, for example, changing the horizontal ruled lines shown in FIG. 4A to the box-shaped ruled lines shown in FIG. 4C.

When the presenter moves his/her hand to perform a gesture (second gesture) for changing the type of ruled lines, the gesture detector 270 of the HMD device 2A detects the second gesture, and the transmitter 200 of the HMD device 2A transmits a second command corresponding to the second gesture to the information processing apparatus 3.

The information processing apparatus 3 receiving the second command generates a display image related to ruled lines of a type different from that of the ruled lines currently displayed as a virtual image, and transmits the generated display image to the HMD device 2A. The HMD device 2A receiving the display image controls the display unit 22 such that the display image related to the changed ruled lines is visually recognized by the presenter as a virtual image on the surface 4a of the whiteboard 4.

For example, in a case where the presenter is holding a pen 100 (see FIG. 7) for inputting input information to the surface 4a of the whiteboard 4, the second gesture corresponds to an operation in which the presenter taps the pen 100 for a predetermined number of times (e.g., twice to five times) with a predetermined finger (e.g., index finger).

Accordingly, the HMD device 2A changes the ruled lines in accordance with the gesture of the presenter so as to cause the presenter to visually recognize the ruled lines as a virtual image.

Third Modification

As an alternative to the above exemplary embodiment in which the spacing of the ruled lines is changed in accordance to the text information acquired by the text-information acquiring unit 301, the spacing of the ruled lines may be changed in accordance with the gesture of the presenter. A detailed description will be provided below.

When the presenter moves his/her hand to perform a gesture (third gesture) for changing the spacing of ruled lines, the gesture detector 270 of the HMD device 2A detects the third gesture, and the transmitter 200 of the HMD device 2A transmits a third command corresponding to the third gesture to the information processing apparatus 3.

The information processing apparatus 3 receiving the third command generates a display image related to ruled lines having a spacing different from that of the ruled lines currently displayed as a virtual image, and transmits the generated display image to the HMD device 2A. The HMD device 2A receiving the display image controls the display unit 22 such that the display image related to the ruled lines having the changed spacing is visually recognized by the presenter as a virtual image on the surface 4a of the whiteboard 4.

For example, in a case where the presenter is holding the pen 100 for inputting input information to the surface 4a of the whiteboard 4, the third gesture corresponds to an operation in which the presenter slides the pen 100.

Fourth Modification

Figure 6:
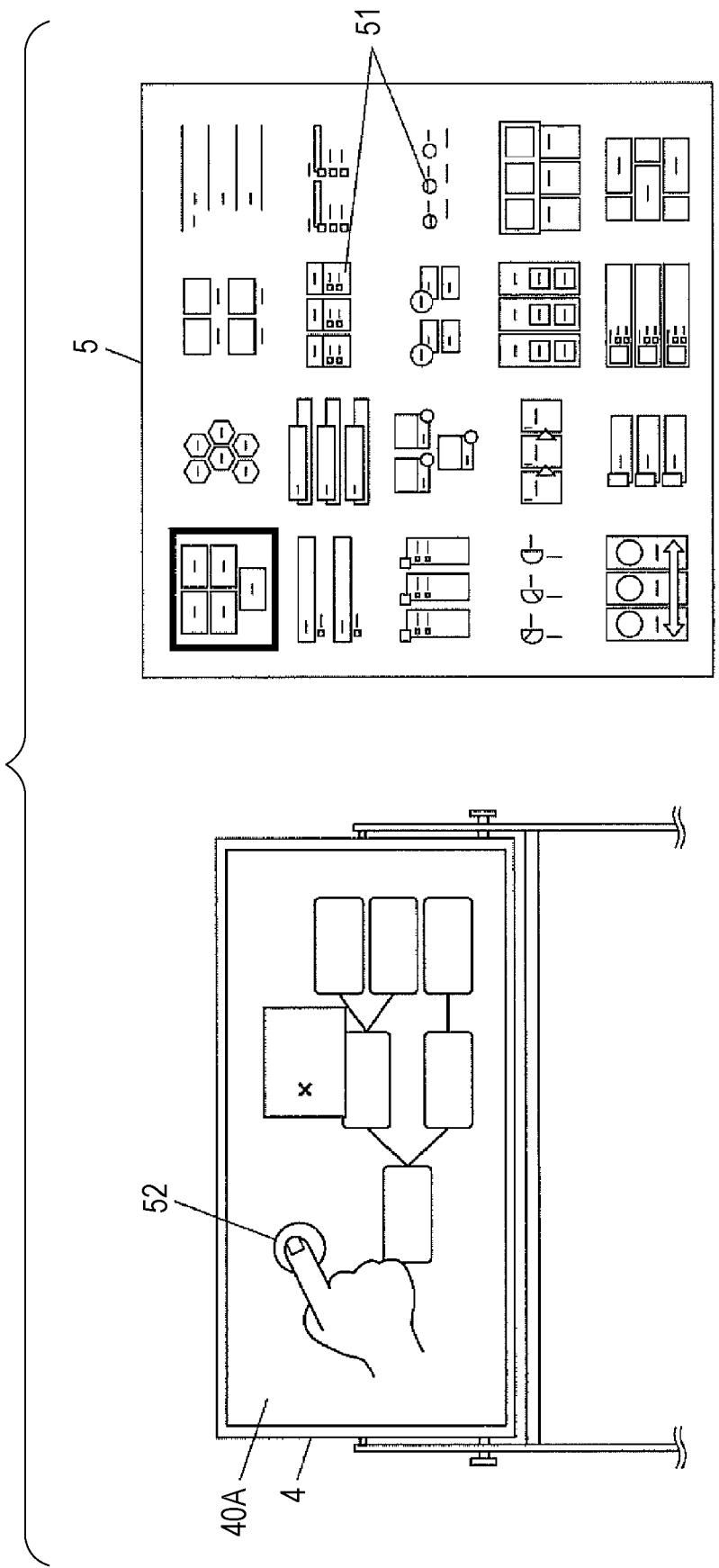
FIG. 6 illustrates an example of support information.

FIG. 6 illustrates an example of support information. As shown in FIG. 6, the HMD device 2A may control the display unit 22 such that a template collection 5 including multiple templates 51 is visually recognized by the presenter as a virtual image near (e.g., at an adjacent position at the upper, lower, left, or right side of) the surface 4a of the whiteboard 4. A detailed description will be provided below.

When the presenter moves his/her hand to perform a gesture (fourth gesture) for changing the spacing of ruled lines, the gesture detector 270 of the HMD device 2A detects the fourth gesture, and the transmitter 200 of the HMD device 2A transmits a fourth command corresponding to the fourth gesture to the information processing apparatus 3.

The information processing apparatus 3 receiving the fourth command generates a display image related to the template collection 5 including the multiple templates 51, and transmits the generated display image to the HMD device 2A. The HMD device 2A receiving the display image may control the display unit 22 such that the display image related to the template collection 5 is visually recognized by the presenter as a virtual image at an adjacent position at the upper, lower, left, or right side of the surface 4a of the whiteboard 4.

For example, the fourth gesture corresponds to an operation in which the presenter designates a predetermined position on the surface 4a of the whiteboard 4 in a virtual space for a predetermined time period (e.g., two to five seconds). Control may be performed such that, for example, a target serving as a marker, such as a pointer 52, is displayed at the predetermined position in the virtual space. The template collection 5 corresponds to, for example, SmartArt (registered trademark).

Fifth Modification

Figure 7:
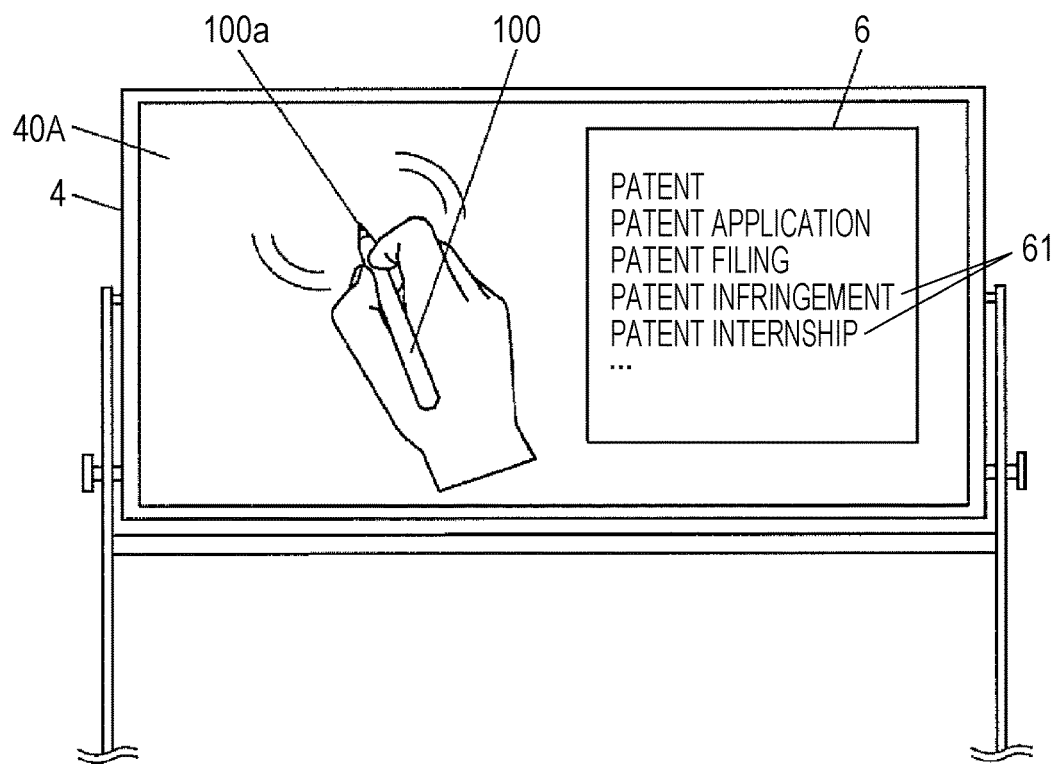
FIG. 7 illustrates an example of support information.

FIG. 7 illustrates an example of support information. As shown in FIG. 7, the HMD device 2A may control the display unit 22 such that a word list 6 including multiple word candidates 61 is visually recognized by the presenter as a virtual image on the surface 4a of the whiteboard 4. A detailed description will be provided below.

When the presenter moves his/her hand to perform a gesture (fifth gesture) for displaying the word list 6, the gesture detector 270 of the HMD device 2A detects the fifth gesture, and the transmitter 200 of the HMD device 2A transmits a fifth command corresponding to the fifth gesture to the information processing apparatus 3.

The controller 20 of the HMD device 2A controls the outward camera 23A every time the fifth command is transmitted from the gesture detector 270 so as to photograph a trajectory of a pen tip 100a. In other words, the outward camera 23A detects a handwriting operation performed in midair by the user. The controller 20 acquires a photographed image obtained as a result of the outward camera 23A photographing the trajectory of the pen tip 100a.

The text-information acquiring unit 301 executes a text-character recognizing process on the photographed image so as to acquire text information included in the photographed image. Furthermore, the text-information acquiring unit 301 predicts the word candidates 61 serving as input candidates from the recognized text (e.g., an alphabetical character or characters). For example, the word candidates 61 may be predicted by using a known method, such as generating the candidates based on a predetermined relevant dictionary. Furthermore, the word candidates 61 may be learned by using, for example, a learning function, such as deep learning. The word candidates 61 are a response to a detected handwriting operation performed in midair by the user.

The display-image generating unit 302 generates a display image related to the word list 6 including the multiple predicted word candidates 61 and transmits the display image to the HMD device 2A. The HMD device 2A receiving the display image controls the display unit 22 such that the display image related to the word list 6 is visually recognized by the presenter as a virtual image on the surface 4a of the whiteboard 4.

For example, the fifth gesture corresponds to an operation in which the presenter brings a predetermined finger (e.g., index finger) into contact with the pen 100.

Sixth Modification

Figure 8:
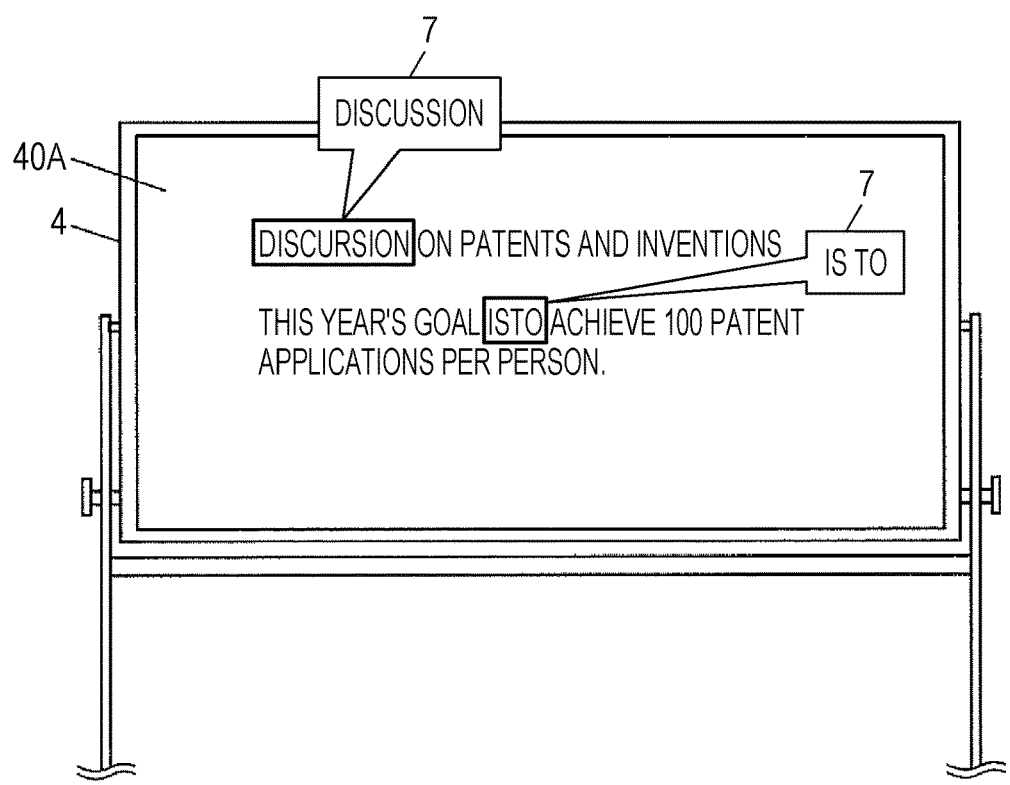
FIG. 8 illustrates an example of support information.

FIG. 8 illustrates an example of support information. As shown in FIG. 8, the HMD device 2A may control the display unit 22 such that a correction candidate 7 is visually recognized by the presenter as a virtual image on the surface 4a of the whiteboard 4. A detailed description will be provided below.

The controller 20 of the HMD device 2A controls the outward camera 23A so as to photograph input information, such as text, input to the surface 4a of the whiteboard 4 by the presenter. The controller 20 acquires the photographed image obtained as a result of the outward camera 23A photographing the surface 4a of the whiteboard 4.

The text-information acquiring unit 301 executes a text-character recognizing process on the photographed image so as to acquire text information included in the photographed image. Furthermore, the text-information acquiring unit 301 checks whether or not the acquired text information includes a misspelling or omission, and if the input information includes a misspelling or omission (sometimes collectively referred to as "typographical error"), the text-information acquiring unit 301 acquires information indicating the location of the typographical error and predicts a correction candidate. Known methods may be used for extracting a misspelling or omission and for predicting a correction candidate.

The display-image generating unit 302 generates a display image including the predicted correction candidate 7 and transmits the display image to the HMD device 2A. The HMD device 2A receiving the display image controls the display unit 22 such that the display image including the correction candidate 7 is visually recognized by the presenter as a virtual image on the surface 4a of the whiteboard 4.

Seventh Modification

Figure 9:
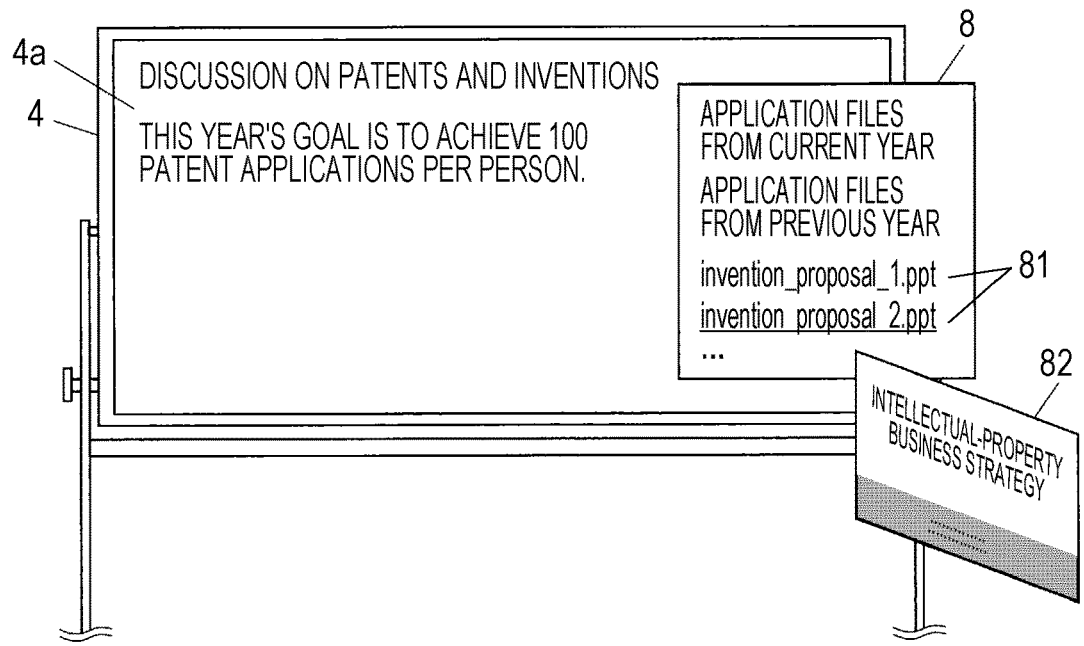
FIG. 9 illustrates an example of relevant information.

FIG. 9 illustrates an example of relevant information. As shown in FIG. 9, the HMD device 2A may control the display unit 22 such that a file list 8 and a file 82 are visually recognized by the presenter as a virtual image on the surface 4a of the whiteboard 4. The file 82 is, for example, data created in accordance with a document creating program, a graphic creating program, or a table calculation program. A detailed description will be provided below.

When the presenter moves his/her hand to perform a gesture (sixth gesture) for displaying the file list 8, the gesture detector 270 of the HMD device 2A detects the sixth gesture, and the transmitter 200 of the HMD device 2A transmits a sixth command corresponding to the sixth gesture to the information processing apparatus 3.

The information processing apparatus 3 receiving the sixth command generates a display image related to the file list 8 and transmits the display image to the HMD device 2A. The HMD device 2A receiving the display image controls the display unit 22 such that the display image related to the file list 8 is visually recognized by the presenter as a virtual image on the surface 4a of the whiteboard 4.

When the presenter selects a specific filename 81 from the file list 8 displayed in the virtual space, the HMD device 2A controls the display unit 22 such that a display image related to the file 82 corresponding to the specific filename 81 is visually recognized by the presenter as a virtual image on the surface 4a of the whiteboard 4.

It is desirable that the file 82 to be displayed in the virtual space be stored in advance in, for example, the storage unit 31 of the information processing apparatus 3.

Eighth Modification

The controller 30 of the information processing apparatus 3 may further include a converter that extracts text from voice data by converting a portion of conversation information (e.g., topic) into text, and an integrator that integrates pieces of conversation information that are relevant to each other. An information processing apparatus equipped with an integrator will be described below in detail.

The receiver 300 of the information processing apparatus 3 determines whether or not voice data is received.

When a participant has a conversation, the sound input unit 25 of the HMD device 2B used by the participant converts the voice produced by the participant into a voice signal and receives the voice signal. The voice recognizer 272 converts the voice signal into voice data. The transmitter 200 transmits the voice data to the information processing apparatus 3.

The receiver 300 of the information processing apparatus 3 receives the voice data. When the receiver 300 receives the voice data, the converter extracts conversation information from the voice data. The integrator integrates pieces of conversation information that are relevant to each other in the extracted conversation information so as to generate integrated information.

An example will now be described. For example, in a case where the pieces of conversation information extracted from the voice data by the converter include "deadline, tomorrow", "invention proposal", "intellectual property department", "supervisor, consult", "program, implement", "original technology", and "high accuracy, high speed", the integrator integrates "deadline, tomorrow", "invention proposal", "intellectual property department", and "supervisor, consult" so as to generate integrated information "patent, invention", and also integrates "program, implement", "original technology", and "high accuracy, high speed" so as to generate integrated information "original technology, develop". Known methods may be used for extracting the conversation information and for generating the integrated information.

Furthermore, the information processing apparatus 3 may generate a display image related to the integrated information and transmit the display image to the HMD device 2A. The HMD device 2A receiving the display image may control the display unit 22 such that the display image related to the integrated information is visually recognized by the presenter as a virtual image on the surface 4a of the whiteboard 4. Moreover, when the presenter selects the integrated information displayed as a virtual image, the HMD device 2A may control the display unit 22 such that the conversion information included in the selected integrated information is visually recognized by the presenter as a virtual image.

Ninth Modification

Figure 10:
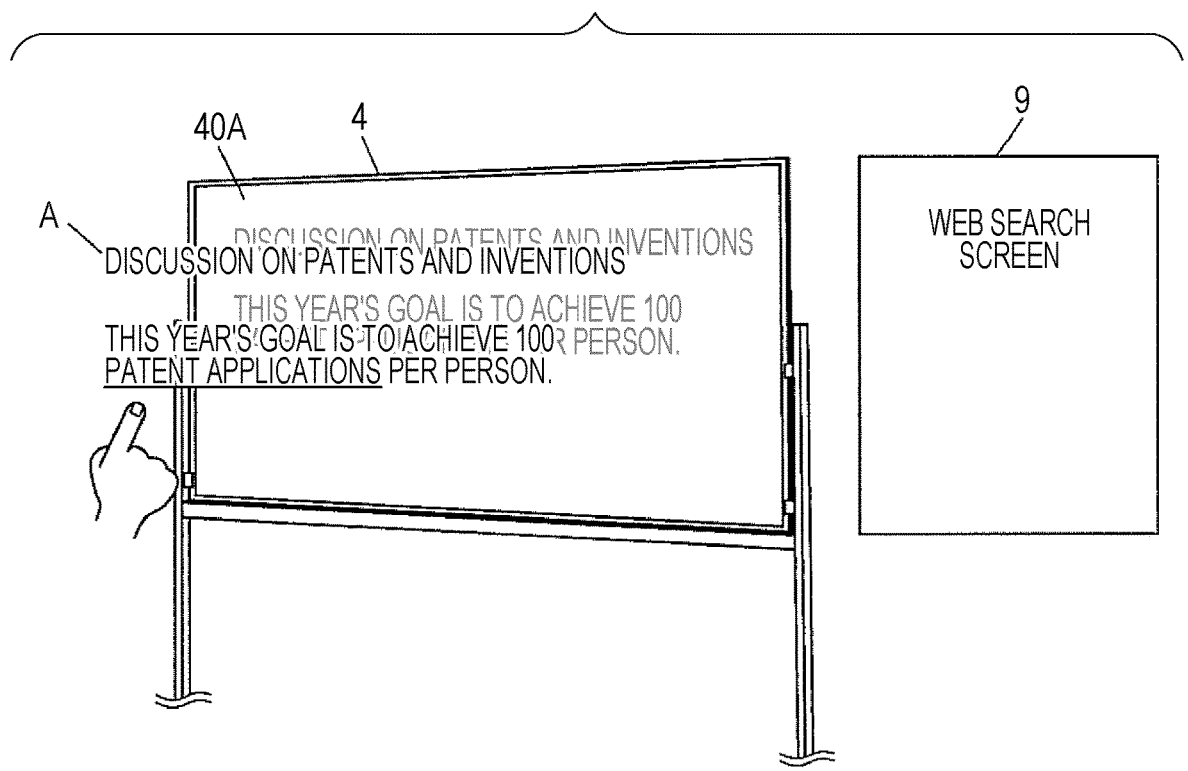
FIG. 10 illustrates an example of relevant information.

FIG. 10 illustrates an example of relevant information. The information processing apparatus 3 may further include a processor that performs specific processing based on movement of the presenter. Specifically, as shown in FIG. 10, based on a display image transmitted from the information processing apparatus 3, the display controller 202 of the HMD device 2A may control the display unit 22 such that a web search screen 9 is visually recognized by the presenter as a virtual image on the surface 4a of the whiteboard 4. A detailed description will be provided below.

When the presenter moves his/her hand to perform a gesture (seventh gesture) for making a command for retrieving input information toward the presenter, the gesture detector 270 of the HMD device 2A detects the seventh gesture, and the transmitter 200 of the HMD device 2A transmits a seventh command corresponding to the seventh gesture to the information processing apparatus 3.

The information processing apparatus 3 receiving the seventh command generates a display image related to the input information and transmits the display image to the HMD device 2A. The HMD device 2A receiving the display image controls the display unit 22 such that the display image related to the input information is visually recognized by the presenter as a virtual image at the presenter side (i.e., front side) of the surface 4a of the whiteboard 4 (see reference sign "A" in FIG. 10).

When the presenter selects a character string (e.g., "patent applications" in FIG. 10) to be searched on the web from input information A retrieved as a virtual screen at the presenter side, the information processing apparatus 3 generates a display image related to the web search screen 9 to be used for searching based on the selected character string, and transmits the display image to the HMD device 2A. The HMD device 2A receiving the display image controls the display unit 22 such that the display image related to the web search screen 9 is visually recognized by the presenter as a virtual image on the surface 4a of the whiteboard 4. In this case, "select" is an example of an operation performed by the user. The displaying of the web search screen 9 used for searching based on the selected character string is an example of processing based on the operation performed by the user. Although the text "patent applications" selected by the presenter is underlined and is indicated in bold for the sake of convenience in FIG. 10, the text may alternatively be displayed in, for example, color.

For example, the seventh gesture corresponds to an operation in which the presenter draws his/her hand closer to him/her.

Accordingly, the presenter is allowed to select a character string in the virtual screen retrieved toward the presenter, so that the presenter may select a character string to be searched for without having to touch text input to the surface 4a of the whiteboard 4 in real space.

Tenth Modification

Positional information of the whiteboard 4 may be acquired in accordance with the following method.

For example, the positional information of the whiteboard 4 may be acquired in accordance with a method that uses map data. Specifically, the map data is preliminarily stored in a storage unit of the information processing apparatus 3. In the map data, a three-dimensional graphic within a building or a room in which the whiteboard 4 is disposed and a whiteboard ID for identifying the whiteboard 4 are linked with each other, and the map data contains positional information indicating a three-dimensional position of the whiteboard 4 disposed within the building or the room. The three-dimensional graphic is to be compared with an image of the whiteboard 4 photographed by the outward camera 23A of each HMD device 2. The positional information and the whiteboard ID of the whiteboard 4 are acquired based on positional information of the HMD device 2, the image including the whiteboard 4 photographed by the outward camera 23A of the HMD device 2, and the map data.

Another method may involve attaching a code image, such as a QR code (registered trademark), in which the positional information indicating the position of the whiteboard 4 and the whiteboard ID thereof are encoded, to the whiteboard 4, transmitting the code image photographed by the outward camera 23A of the HMD device 2 to the information processing apparatus 3, and acquiring the positional information of the whiteboard 4 by decoding the code image at the information processing apparatus 3.

When the transmitter 303 transmits, to the HMD device 2, a display image and positional information at which the display image is to be visually recognized as a virtual image, the display controller 202 of the HMD device 2 performs control such that the display image is displayed as a virtual image at the position indicated in the positional information.

Although exemplary embodiments of the present invention have been described above, the exemplary embodiments of the present invention are not limited to the above exemplary embodiments, and various modifications are permissible within the scope of the invention.

Each of the components included in the controllers 20 and 30 may be partially or entirely constituted of a hardware circuit, such as a field programmable gate array (FPGA) or an application specific integrated circuit (ASIC).

One or some of the components in each of the above exemplary embodiments may be omitted or changed within the scope of the invention. Furthermore, in the flowchart in each of the above exemplary embodiments, for example, a step or steps may be added, deleted, changed, or interchanged within the scope of the invention. Moreover, the program used in each of the above exemplary embodiments may be provided by being recorded on a computer readable recording medium, such as a compact disc read-only memory (CD-ROM). Alternatively, the program used in each of the above exemplary embodiments may be stored in an external server, such as a cloud server, and may be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
detect a position of an input target and a size of input information input to the input target from an image photographed by a display device that has a photographing function;

generate a display image of ruled lines in accordance with the detected size of the input information;

determine a display position where the display device displays the display image in accordance with the detected position of the input target; and command the display device to display the display image at the determined display position.

2. The information processing apparatus according to claim 1, wherein the processor is further configure to make a command to change the ruled lines in accordance with the size of the input information.

3. The information processing apparatus according to claim 1, wherein the processor is further programmed to detect movement of a finger or hand of the user holding a writing unit that is used for inputting the input information to the input target, and wherein the processor is programmed to make a command to display the display image of ruled lines in accordance with the movement of the finger or hand of the user.

4. The information processing apparatus according to claim 1, wherein the processor is programmed to make a command to display the display image of ruled lines on a surface, at a front side, or at an adjacent position of the input target.

5. The information processing apparatus according to claim 1, wherein the processor is programmed to make a command to display the display image of ruled lines and the input information at a position located in front of the input target, and wherein the processor is further programmed to execute processing based on an operation performed by the user with respect to the input information.

6. The information processing apparatus according to claim 1, wherein the display device includes a sound input unit, wherein the information processing apparatus further comprises a converter that extracts a portion from a voice acquired from the sound input unit and converts the portion into text, and wherein the processor is further programmed to make a command to display the converted text.

7. The information processing apparatus according to claim 1, wherein the processor is further programmed to:

detect movement of a user using the display device from the image photographed by the display device that has the photographing function;

select at least a part of the detected input information based on the movement of the user;

recognize at least one character included in the selected part of the input information;

generate related information based on the recognized character; and command the display device to display the generated related information.

8. The information processing apparatus according to claim 7, wherein the related information is information indicating a location of a typographical error in a case where the input information includes the typographical error.

9. The information processing apparatus according to claim 7, wherein the related information is support information that is a file list or a web search result related to the input information.

10. The information processing apparatus according to claim 1, wherein the processor is further programmed to determine whether spacing between the ruled lines in the display image of ruled lines is suitable for the size of text of the input information by comparing the text information with ruled-lines information to determine a spacing of the ruled lines displayed as a virtual-space image.

11. A non-transitory computer readable medium storing a program causing a computer to execute a process for processing information, the process comprising:

detecting a position of an input target and a size of input information input to the input target from an image photographed by a display device that has a photographing function;

generating a display image of ruled lines in accordance with the detected size of the input information;

determining a display position where the display device displays the display image in accordance with the detected position of the input target; and commanding the display device to display the display image at the determined display position.

* * * * *